Oct. 7, 1941.  A. O. CARPENTER  2,258,278
CONTROLLING DEVICE
Filed Sept. 25, 1940  2 Sheets-Sheet 1

INVENTOR
Allan O. Carpenter.
BY
HIS ATTORNEY.

Oct. 7, 1941.  A. O. CARPENTER  2,258,278
CONTROLLING DEVICE
Filed Sept. 25, 1940  2 Sheets-Sheet 2

INVENTOR
Allan O. Carpenter
BY
HIS ATTORNEY.

Patented Oct. 7, 1941

2,258,278

UNITED STATES PATENT OFFICE 2,258,278

CONTROLLING DEVICE

Allan O. Carpenter, Corning, N. Y., assignor to Ingersoll-Rand Company, New York, N. Y., a corporation of New Jersey Application September 25, 1940, Serial No. 358,265

19 Claims. (Cl. 230—9)

This invention relates to a controlling device and, more particularly, to a device employed in controlling the operation of an engine for driving a fluid compressor.

In the operation of a fluid compressor unit consisting of a compressor driven by an engine, the operation of the engine must be regulated for the sake of economy. One way of regulating the operation is by controlling the means supplying energizing fluid to the engine as, for instance, changing the cut-off by regulation of the valve gear of a steam engine. Under the practice of the present invention the regulation is dependent upon two independent factors. One factor is the load on the compressor as measured by the compressor discharge or receiver tank pressure and the second is the engine speed as measured by a fluid pressure varying in accordance with the speed of the engine. These two factors act together to secure the desired regulation of the engine.

It is, therefore, an object of the invention to provide a novel means for controlling the operation of an engine.

Another purpose of the invention is to provide a device for regulating the operation of a compressor driving engine in accordance with variations in the compressor discharge pressure and the engine speed.

Still another object is to provide a fluid actuated device responsive to compressor discharge pressure variations and the engine speed to vary the supply of energizing fluid to an engine driving a compressor.

An additional object is to provide a device for controlling the supply of energizing fluid to the engine of an engine driven fluid compressor wherein the device is responsive to a fluid under a pressure varying in accordance with the compressor discharge pressure and the speed of the engine.

Another object is to provide a device movable by fluid pressure actuated means to control the operation of an engine driving a fluid compressor wherein movement of the fluid pressure actuated means stops the flow of pressure fluid thereto.

A still further object is to provide a device movable by a fluid pressure actuated means to regulate the operation of an engine driving a compressor in accordance with variations in the discharge pressure and variations in the speed of the engine wherein movement of the fluid pressure actuated means stops the supply of pressure fluid thereto.

These and other objects will be apparent from the following description of which the drawings form a part and in which Figure 1 is a view partly in section and partly in elevation showing a controlling device constructed and arranged in accordance with the principles of the present invention.

Figure 2:
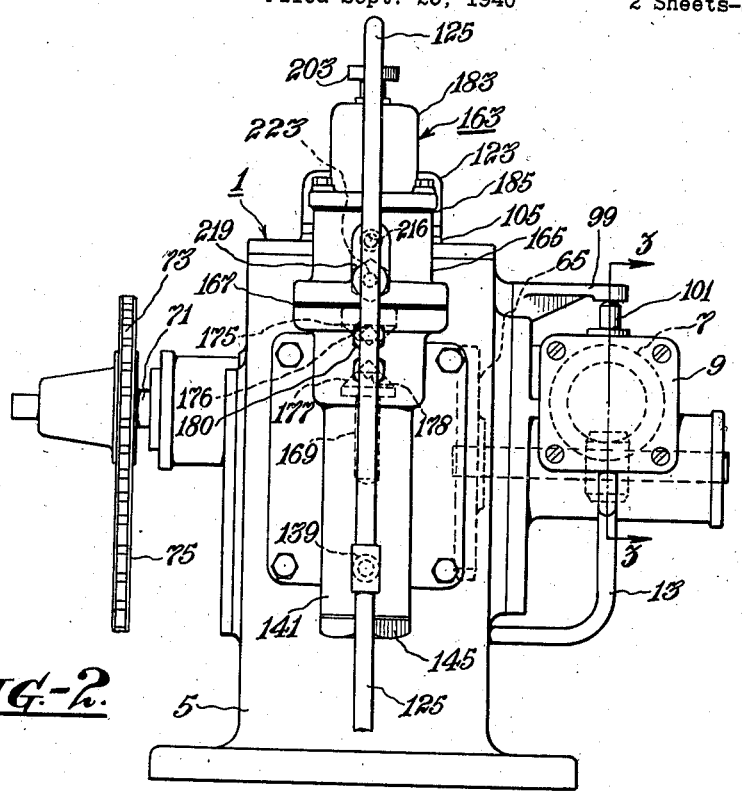
Figure 2 is an elevational view of the controlling device taken along line 2—2 of Fig. 1.
Figure 3:
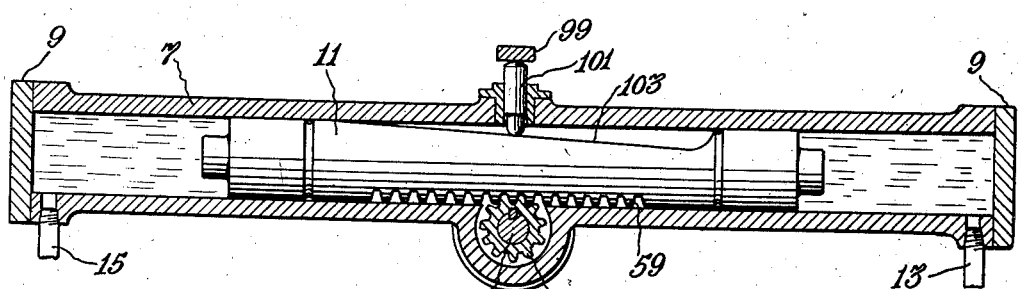
Figure 3 is a sectional view taken along line 3—3 of Fig. 2.

Referring to the drawings, the controlling device is generally indicated at 1 and includes an oil reservoir 3 defined by a casing 5. Supported adjacent one side of the casing 5, as can be seen from Fig. 2, is a fluid pressure actuated means, or cylinder, 7. The ends 9 of the cylinder 7 serve to form a fluid tight chamber for the double-acting piston 11 (Fig. 3) slidably engaging the bore of the cylinder. Fluid under pressure may be supplied to either end of the cylinder by means of conduits 13 and 15.

With this arrangement, if it is desired to move the piston 11 toward the left hand end of the cylinder, fluid under pressure must be admitted through the conduit 13. As the fluid is admitted, any fluid at the left hand end of the cylinder can escape through the conduit 15. Similarly, if it is desired to move the piston toward the right, fluid under pressure is admitted through conduit 15 while conduit 13 serves to remove any fluid in the cylinder space at the right of the piston.

The fluid under pressure employed for this purpose, in the present instance, is oil which is withdrawn from the reservoir 3, through the pipe 17, by the pump 19 driven by the engine on which the controlling device is provided. The discharge pipe 21, for pump 19, carries oil under pressure to an oil distributor valve 23 which has an outer casing 25 provided with passages 27 and 29 respectively connected to the conduits 21 and 15. Securely fastened in a recess 31, formed in the casing 25, is sleeve 33 having a port 35 opening into passage 27; annular recesses 37 and 39; a second port 41 communicating with conduit 13 and a third port 43 opening into passage 29. The second port 41 establishes communication between the annular recess 37 and the conduit 13 leading to the cylinder 7, while the third port 43 similarly permits communication between the conduit 15 and the annular recess 39. Near the top of the sleeve are two more ports 45 opening into the passages 47 extending through the casing 25 and opening into the reservoir 3.

Slidably maintained in the bore of sleeve 33 is a second sleeve 49 resting on a spring 51, in the recess 31 and on the plug 52, and held thereagainst by the stem 53. The sleeve 49 has three annular recesses 55. With this arrangement, when the sleeve 49 is in the position shown in Fig. 1, any oil supplied through the discharge pipe 21 from the pump 19 cannot flow to the cylinder 7. However, if the stem 53 moves the sleeve 49 downwardly, oil entering from passage 27 through the port 35 may flow through the middle annular recess 55 to the annular recess 37 and thence through opening 41 and conduit 13 to the right hand end of the cylinder 7 to move the piston 11 toward the left. At the same time, the upper annular passage 55 permits communication between the annular recess 39 and the ports 45 so that any oil flowing from the cylinder through the conduit 15 to the distributing valve 23 may escape through one of the passages 47 to the oil reservoir 3.

If, on the other hand, the stem allows the sleeve 49 to rise, communication is established by the middle annular recess 55 between the port 35 and the annular recess 39 so that oil may flow therethrough to the conduit 15 and into the left hand end of the cylinder to drive the piston toward the right. Simultaneously therewith, the lower annular recess 55 establishes communication between the annular recess 37 and discharge ports 57 in the sleeve 33 so that oil returning from the cylinder through conduit 13 may flow into the recess 31 and thence into the oil reservoir 3 through appropriate passages (not shown).

Any movement of the piston 11 is transmitted to the valve gear of the engine (not shown) being controlled by the device of the present invention to change the supply of energizing fluid to the engine. To this end the piston is provided with a rack 59 for engaging the pinion 61 suitably keyed to a shaft 63 on which is secured a sprocket wheel 65. The chain 67 transmits movement of the sprocket wheel 65 to a second sprocket 69 keyed to shaft 71. The shaft 71 has mounted thereon a third sprocket 73 and engages the chain 75 which is designed to mesh with a fourth sprocket (not shown) mounted on the valve gear.

As a result, any movement of the piston to the right or left will be transmitted by the above described sprocket and chain arrangement. With the arrangement here shown, movement of the piston toward the right will increase the speed of the engine and movement toward the left will decrease the speed of the engine. Movement of the piston is, of course, controlled by the distributing valve 23 which is, in turn, moved in accordance with variations in the fluid discharge pressure of the compressor driven by the engine, to which the controlling device is attached, and by the speed of the engine.

A distributor valve linkage, or series of levers, is employed in moving the distributor valve by moving the stem 53. Pivotally connected to the stem is a lever 77 which is pinned at one end to a second lever 79, pivoted at 81, and at the opposite end to a third lever 83. The lever 83 is in turn pivotally mounted on a rocker arm 85 secured on a shaft 87 by the key 89. One end of the rocker arm has a projection 91 resting on the bearing member 93 to compress a spring 95 against the cup 97 formed in the casing 5. Also fastened to the shaft 87 is an arm 99 resting on the plunger 101 extending through and guided by an appropriate opening in the cylinder 7. Formed on piston 11 is a groove 103 which is of tapering depth being deeper at its right hand end than at its left hand end. Upon movement of the piston 11 the plunger 101 is raised or lowered depending upon the direction of movement of the groove 103 in which the plunger 101 is held by the spring 95. The lever system actuated by the plunger 101 and groove 103, consisting in general of arm 99, shaft 87, rocker arm 85 and the lever 83, is generally designated as the compensating linkage in that this linkage, because of the design of the groove, tends to return the sleeve 49 to the position where no fluid is supplied to the cylinder 7 whenever the piston has been moved by admission of fluid under pressure to the cylinder 7.

The pressure responsive means employed to move the oil distributor valve in accordance with the variations in engine speed and the compressor discharge pressure will now be described. At the top of the casing 5 is a bore through which extends the sleeve casing 105. The lower part of the sleeve is closed by a cup-shaped member 107 having an opening through which extends plunger 109 provided with an enlarged head 111 designed to bear against lever 79. The sleeve casing has an internal shoulder 113 on which rests the bushing 115 to support the spring 117 compressed between it and bushing 119 secured on the plunger 109 by the nut 121. With this arrangement the spring 117 normally holds the plunger head 111 in its highest position.

Surmounting the sleeve casing 105 is the casing head 123 to which is secured the conduit 125 leading to the fluid pressure supply means, or oil pump, 127. Pump 127, similar to pump 19, is driven by the engine to which the controlling device is attached, and is provided with an inlet conduit 129 through which oil is removed from the reservoir 3 and an outlet conduit 125 through which it may be discharged.

A by-pass passage 131 is provided in the pump 127 to by-pass oil, if the pressure in the conduit 125 and the pressure acting on the cup-shaped member 107 becomes excessive. This passage is controlled by the check valve 133 held against its seat 134 by a spring 135 compressed by the nut 137. Thus the pressure at which the check valve will open is predetermined by the scale of the spring and the amount it is compressed by the nut 137.

As the speed of the engine increases, the speed of the pump 127 will likewise be increased, with the result that the oil delivered therefrom will increase in pressure. When this pressure is transmitted to the cup-shaped member 107, it actuates the plunger 109 and moves lever 79 which rotates about its pivot 81 thus moving lever 77 and stem 53 downwardly.

Downward movement of the sleeve 49 permits oil from the pump 19 to flow through the conduit 13 to the right hand side of cylinder 7 and move the piston 11 toward the left as has been explained. Leftward movement of the piston will be transmitted to the valve gear on the engine by the sprocket wheel arrangement and the engine speed will be decreased.

If the pump 127 were the only means controlling the pressure acting on plunger 109, every change in speed would change the oil pressure to move the plunger 109 and vary the speed of the engine. However, a means responsive to the compressor discharge pressure coacts with the oil pump pressure to control movement of the plunger 109. In this connection, the by-pass conduit 139 is connected to the conduit 125 and threadedly engages a casing 141 which is suitably secured to the casing 5. A bore 143 in the casing 141 is in open communication with the by-pass conduit 139 and is closed by the plug 145 which extends into and through the bore 143. The plug is provided with a central recess 147 to receive the valve 149 slidably engaging the walls thereof. At a point adjacent the conduit 139 the outer diameter of the plug is reduced in order to form an annular space 151 opening into ports 153, leading to the central recess 147, so that oil supplied from conduit 139 may enter the central recess 147.

The valve 149 has an annular groove 155 through which fluid may flow to the slots 157 formed in the plug 145, when the valve is in the proper position. It will be noted that the valve is normally raised by the spring 159 so that communication is possible between the ports 153 and the slots 157 through the annular groove 155. Thus, the oil supplied escapes through the slots 157 and is returned to the reservoir 3 through the opening 161 in the wall of the casing 141.

Figure 1:
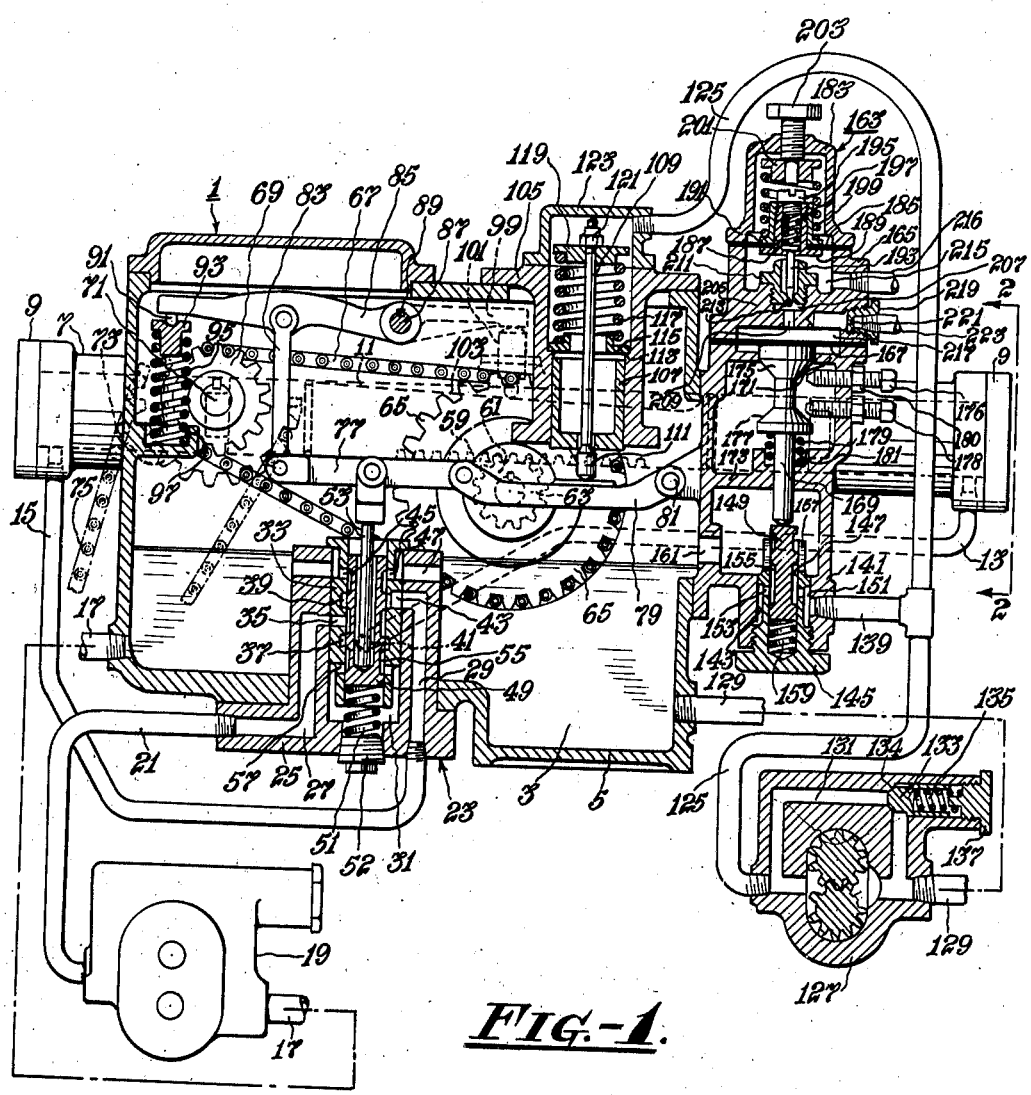

With the valve 149 in the position shown in Fig. 1 the oil pressure in the conduit 125 would never increase sufficiently to move the cup-shaped member 107 and plunger 109 since the oil would be constantly led back to the oil reservoir 3. In order to move the valve 149 to restrict the flow of oil to the reservoir, a pressure actuated means or valve, generally indicated at 163, responsive to variations in the compressor discharge pressure is provided.

This valve comprises a valve body 165 resting on the upper portion of casing 141. A flexible diaphragm 167 is placed between the valve body 165 and the casing 141 and rests directly on the plunger 169. The plunger is guided by wall 171 and wall 173 both formed integral with casing 141. The upper part of the plunger has a head 175 of enlarged diameter to bear on the diaphragm 167 and a short distance below the head is a shoulder 177. The shoulder serves as a seat for the spring 179 which lies in the cup 181 formed in the wall 173. The spring normally urges the plunger head 175 against the diaphragm 167 and holds the end of the plunger in such a position that the valve 149 may be held in its upper position by its spring 159.

The lower surface of head 175 and the upper surface of shoulder 177 are both coniform and are designed to coact respectively with complementary surfaces on the bolts 176 and 178 which extend between the head and shoulder. The bolt 176, secured in any predetermined position by a lock nut 180, limits the downward movement of the plunger 169 and in order to shorten the permissible downward travel of the plunger 169, the bolt 176 is moved inwardly toward the plunger. Conversely, to lengthen the permissible downward travel, the bolt is moved outwardly away from the plunger. The bolt 178 adjustably limits the upward movement of the plunger 169 in a similar manner. By means of this arrangement, the bolt 176 is used to determine the minimum compressor speed that can be achieved by downward movement of the plunger and the bolt 178 is used to determine the maximum compressor speed that may be achieved by upward movement of the plunger 169.

Surmounting the valve body 165 is a bonnet 183 which is separated from the body by a second flexible diaphragm 185. The diaphragm 185 has a central opening 187 through which extends the bushing 189 engaging a second bushing 191 to clamp the diaphragm 185 therebetween. The bore of bushing 189 is reduced in diameter at its lower end in order that a needle valve 193 passing therethrough may be held in position by its head. The upper part of the bore is closed by a plug 195 to maintain a spring 197, in the bore, bearing against the head of the needle valve 193. An external spring 199 encompasses the bushing 191 and rests thereon. The compressing force of this spring may be regulated by the bushing member 201 rotatably mounted on the hand screw 203 which threadedly engages and extends through the bonnet 183.

The valve body 165 has a central wall 205 having a central recess 207 communicating with bore 209 of reduced diameter. The recess 207 is threaded to receive the plug 211 which is also bored to receive the needle valve 193 and is provided with a metering orifice 213 into which the end of the needle valve extends. Fluid under pressure may be supplied to the chamber 215 formed above the central wall 205 by conduit 216 leading to the compressor receiver tank (not shown). If the pressure of the fluid is sufficient, it will tend to raise the diaphragm 185 and bushing 189 and in that manner raise needle valve 193 so that the orifice 213 may be opened. When the metering orifice 213 is open, fluid under pressure may flow through the bore 209 into the lower chamber 217 and the pressure of the fluid may then act on the diaphragm 167.

In order to reduce the pressure in this chamber 217, when the metering orifice 213 is being closed by the needle valve 193 and to permit variations in pressure to effect the diaphragm 167, an atmospheric vent comprising the plug 219 having an orifice 221 is open into chamber 217 and communicates with a vent pipe 223.

Thus, as the pressure in the receiver tank rises, the increase in pressure in chamber 215 will tend to raise diaphragm 185 allowing pressure fluid to enter chamber 217 and depress diaphragm 167. Depression of this diaphragm will, of course, force the plunger 169 downwardly and move valve 149 to a lower position. At a pressure predetermined by the position of bolt 176 valve 149 will reach its lowest position and the annular groove 155 will only permit the escape of enough oil through the slots 157 to maintain the operation of the compressor at minimum speed. As a result, the pressure of the oil delivered by the pump 127 is slightly reduced and is transmitted to the cup-shaped member 107 and plunger 109 to force the sleeve 49 downwardly and decrease the speed of the engine, as has been pointed out.

This, of course, will not occur suddenly but will be a gradual movement as the pressure in the conduit 125 is increased with the gradual lowering of the valve 149. Under these circumstances, where the engine speed is being decreased, the piston 11 is moved toward the left and, consequently, the compensating linkage tends to move upwardly due to the force exerted by the spring 95 and the lowering of arm 99 as plunger 101 slides down groove 103. Raising of lever 83 will move the stem 53 upwardly and allow the sleeve 49 to return to its original position thus cutting off the supply of fluid under pressure to the cylinder. Consequently, although the compressor discharge pressure may cause a decrease in the speed of the engine, the effect of the compressor discharge pressure, if it remains constant, is nullified upon movement of the piston by the distributor valve 23 which moves to a position preventing further supply of fluid to the cylinder.

If the compressor discharge pressure decreases, the diaphragm 185 is gradually urged downwardly by the spring 199 and needle valve 193 begins to close the orifice 213, thus preventing the flow of fluid under pressure from the chamber 215 to the lower chamber 217. Any fluid under pressure remaining in the chamber 217 is permitted to escape gradually through the orifice 221 and relieves the pressure on diaphragm 167 so that it may return to its normal position and allow the plunger 169 and valve 149 to rise under the influence of their respective springs. As the valve 149 rises, the quantity of oil flowing through the groove 155 and the slots 157 increases so that the pressure in the conduit 125 is decreased and plunger 109 is permitted to move upwardly. Upward movement of the plunger 109 allows the sleeve 49 to move upwardly and, as has been explained, enables oil under pressure to be supplied through the conduit 15 to move the piston 11 toward the right.

During the rightward movement of the piston the compensating linkage will be urged downwardly by the plunger 101 which is moved upwardly by the tapering groove 103 against the force of spring 95. This results in a downward movement of lever 83 and lever 77, thus returning valve 49 to its normal position as a non-supplier of fluid.

These changes in compressor discharge pressure are not necessarily continuous in direction, but there may be a slight increase followed by a slight decrease or vice versa. In any event, it will be seen that the apparatus is readily adapted for increasing or decreasing the speed of the engine in direct accordance with the compressor discharge pressure and, also, with the speed of the engine, since the pressure in conduit 125 will always be influenced by the speed of the engine regardless of the position of valve 149.

I claim:

1. In a control device for an engine driven fluid compressor having means for regulating the supply of energizing fluid to the engine, the combination of fluid pressure actuated means for actuating the supply regulating means, means to supply fluid under pressure to the fluid pressure actuated means, pressure responsive means to control supply means, means to supply fluid varying in pressure in accordance with variations in the compressor discharge pressure to the pressure responsive means, and means actuated by the fluid pressure actuated means to render the first supply means ineffective.

2. In a control device for an engine driven fluid compressor having means for regulating the supply of energizing fluid to the engine, the combination of fluid pressure actuated means for actuating the supply regulating means, means to supply fluid under pressure to the fluid pressure actuated means, pressure responsive means to control the supply means, means for supplying fluid under pressure to the pressure responsive means, means to vary the pressure of the fluid supplied by the last said means in accordance with variations in the compressor discharge pressure, and means actuated by the fluid pressure actuated means to render the first supply means ineffective.

3. In a control device for an engine driven fluid compressor having means for regulating the supply of energizing fluid to the engine, the combination of fluid pressure actuated means for actuating the regulating means, means to supply fluid under pressure to the fluid pressure actuated means, pressure responsive means to control the supply means, means for supplying fluid under pressure to the pressure responsive means, means to vary the pressure of the fluid supplied by the last said means, means to actuate the varying means in accordance with variations in the compressor discharge pressure, and means actuated by the fluid pressure actuated means to render the first supply means ineffective.

4. In a controlling device for an engine driven fluid compressor having movable means to regulate the supply of energizing fluid to the engine, the combination of fluid pressure actuated means to move the movable means, means to control the supply of fluid to the fluid pressure actuated means in accordance with variations in the compressor discharge pressure, and means actuated by the fluid pressure actuated means to stop the supply of fluid thereto.

5. In a controlling device for an engine driven fluid compressor having movable means to regulate the supply of energizing fluid to the engine, the combination of fluid pressure actuated means to move the movable means, means regulating the supply of pressure fluid to the fluid pressure actuated means, means responsive to variations in the compressor discharge pressure to actuate the regulating means to supply pressure fluid to the fluid pressure actuated means, and means actuated by the fluid pressure actuated means to actuate the regulating means to stop the supply of pressure fluid to the fluid pressure actuated means.

6. In a control device for an engine driven fluid compressor having means to control the supply of energizing fluid to the engine to vary the speed thereof, the combination of a fluid pressure actuated device to control the first means, means to supply fluid under pressure for actuating fluid pressure actuating device, and means to regulate the supply means in accordance with variations in the compressor discharge pressure and in the speed of the engine.

7. In a control device for an engine driven fluid compressor having means to regulate the supply of energizing fluid to the engine, the combination of fluid pressure actuated means to control the supply regulating means, pressure responsive means to control the supply of fluid under pressure for actuating the fluid pressure actuated means comprising a valve, a pressure actuated plunger, means to supply fluid under pressure to the plunger, means to vary the pressure of the fluid supplied to the plunger in accordance with the compressor discharge pressure, means movable by the plunger to actuate the valve to supply fluid to the fluid pressure actuated means, and means actuated by movement of the fluid pressure actuated means to actuate the valve to prevent the supply of fluid to the fluid pressure actuated means.

8. In a control device for an engine driven fluid compressor having means to regulate the supply of energizing fluid to the engine, the combination of fluid pressure actuated means to control the supply regulating means, pressure responsive means to control the supply of pressure fluid for actuating the fluid pressure actuated means comprising means to supply a fluid under pressure, a plunger actuated by said fluid, means to vary the pressure of the fluid in accordance with the variations in the compressor discharge pressure, and a valve movable by said plunger to direct pressure fluid to the fluid pressure actuated means.

9. In a control device for a steam engine driven fluid compressor having a steam cut-off valve, the combination of a cylinder, a double-acting piston in the cylinder to move the steam cut-off valve, means to supply oil under pressure, a valve to control the supply of oil from said means to the piston, a compressor discharge pressure actuated means to regulate the control valve to supply oil to the piston, and means actuated upon movement of the piston to actuate the control valve to stop the supply of oil to the piston.

10. In a control device for a steam engine driven fluid compressor having a steam cut-off valve, the combination of a cylinder, a double-acting piston in the cylinder adapted upon movement to actuate the steam cut-off valve, a pump to supply oil under pressure, a valve having positions for supplying oil from the pump to the ends of the cylinder to actuate the piston and a non-supplying position, means to move the valve in accordance with variations in the compressor discharge pressure to the positions supplying oil to the cylinder, and means associated with the piston to move the valve to the non-supplying position upon movement of the piston.

11. In a control device for an engine driven fluid compressor having means to regulate the supply of energizing fluid to the engine, the combination of fluid pressure actuated means to control the regulating means, means to control the supply of pressure fluid to the fluid pressure actuated means, a pressure responsive plunger, a series of levers to transmit movement of the plunger to the last means, an engine driven pump to supply fluid under pressure to the plunger, a pressure controlling valve to regulate the pressure of the fluid supplied to the plunger, a second plunger movable in accordance with the variations in the compressor discharge pressure to actuate the pressure controlling valve, a second series of levers to transmit movement of the fluid pressure actuated means to control means and prevent supply of pressure fluid to the fluid pressure actuated means.

12. In a control device for an engine driven fluid compressor having means for regulating the supply of energizing fluid to the engine, the combination of pressure responsive means to control the supply regulating means, and means to supply fluid varying in pressure in accordance with variations in the compressor discharge pressure and in the speed of the engine to the pressure responsive means.

13. In a control device for an engine driven fluid compressor having means for regulating the supply of energizing fluid to the engine, the combination of pressure responsive means to control the supply regulating means, means to supply fluid varying in pressure in accordance with the speed of the engine to the pressure responsive means, and means to vary the pressure of said fluid in accordance with variations in the compressor discharge pressure.

14. In a control device for an engine driven fluid compressor having means for regulating the supply of energizing fluid to the engine, the combination of fluid pressure actuated means for actuating the supply regulating means, pressure responsive means to control the supply of fluid to the fluid pressure actuated means, and means to supply fluid varying in pressure in accordance with variations in the compressor discharge pressure and in the speed of the engine to the pressure responsive means.

15. In a control device for an engine driven fluid compressor having means for regulating the supply of energizing fluid to the engine, the combination of fluid pressure actuated means for actuating the supply regulating means, means to supply fluid under pressure to the fluid pressure actuated means, pressure responsive means to control supply means, means to supply fluid varying in pressure in accordance with variations in the compressor discharge pressure and in the speed of the engine to the pressure responsive means, and means actuated by the fluid pressure actuated means to render the first supply means ineffective.

16. In a control device for an engine driven fluid compressor having means for regulating the supply of energizing fluid to the engine, the combination of fluid pressure actuated means for actuating the supply regulating means, means to supply fluid under pressure to the fluid pressure actuated means, pressure responsive means to control the supply means, means for supplying fluid varying in pressure in accordance with the speed of the engine to the pressure responsive means, means to vary the pressure of the fluid supplied by the last said means, means to actuate the varying means in accordance with variations in the compressor discharge pressure, and means actuated by the fluid pressure actuated means to render the first supply means ineffective.

17. In a control device for an engine driven fluid compressor having movable means to regulate the supply of energizing fluid to the engine, the combination of means actuated by a fluid under pressure to move the supply regulating means, and means to control the supply of fluid to the last said means in accordance with variations in the compressor discharge pressure and in the speed of the engine.

18. In a control device for an engine driven fluid compressor having movable means to regulate the supply of energizing fluid to the engine, the combination of fluid pressure actuated means to move the movable means, means to control the supply of fluid to the fluid pressure actuated means in accordance with variations in the compressor discharge pressure and in the speed of the engine, and means actuated by the fluid pressure actuated means to stop the supply of fluid thereto.

19. In a speed controlling device for an engine driven fluid compressor, the combination of movable means to control the supply of energizing fluid to the engine and vary the speed of the engine, a cylinder, a double-acting piston in the cylinder, means to transmit movement of the piston to the movable means to vary the speed of the engine, means to supply fluid under pressure to either end of the cylinder to move the piston in accordance with variations in the compressor discharge pressure, and means actuated upon movement of the piston to render the last means ineffective to supply fluid under pressure to either end of the cylinder.

ALLAN O. CARPENTER.